(12) United States Patent
Liu et al.

(10) Patent No.: US 9,351,035 B2
(45) Date of Patent: May 24, 2016

(54) HYBRID MEDIA RECEIVER, MIDDLEWARE SERVER AND CORRESPONDING METHODS, COMPUTER PROGRAMS AND COMPUTER PROGRAM PRODUCTS

(75) Inventors: Fanghua Liu, Shanghai (CN); Jan Erik Lindquist, Alvsjo (SE); Yanming Xia, Beijing (CN); Jinyang Xie, Shanghai (CN); Michael Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/007,397

(22) PCT Filed: Mar. 25, 2011

(86) PCT No.: PCT/CN2011/072174
§ 371 (c)(1),
(2), (4) Date: Sep. 25, 2013

(87) PCT Pub. No.: WO2012/129762
PCT Pub. Date: Oct. 4, 2012

(65) Prior Publication Data
US 2014/0020021 A1     Jan. 16, 2014

(51) Int. Cl.
*H04N 5/445* (2011.01)
*H04N 21/438* (2011.01)
(Continued)

(52) U.S. Cl.
CPC ........ *H04N 21/4383* (2013.01); *H04L 65/4076* (2013.01); *H04N 21/25833* (2013.01);
(Continued)

(58) Field of Classification Search
CPC .. H04N 5/44543; H04N 21/84; H04N 21/482

USPC .............. 725/39, 44, 45, 48–51, 91–93, 725/114–116; 709/218, 219
See application file for complete search history.

(56) References Cited

U.S. PATENT DOCUMENTS 5,684,525 A     11/1997  Klosterman
7,149,772 B1 *  12/2006  Kalavade .......... H04L 29/06027
                                                         370/352

(Continued)

FOREIGN PATENT DOCUMENTS

CN        2854953 Y     1/2007
CN        1984233 A     6/2007

OTHER PUBLICATIONS

Supplementary European Search Report, EP Application No. 11862248.9 dated Aug. 13, 2014, Applicant: Telefonaktiebolaget L M Ericsson (Publ), 8 pages.

*Primary Examiner* — Annan Shang
(74) *Attorney, Agent, or Firm* — Rothwell, Figg, Ernst & Manbeck, P.C.

(57) ABSTRACT

It is presented a hybrid media receiver capable of receiving broadcast media content using a first broadcast media network and a second broadcast media network, wherein the first broadcast media network complies with Internet Protocol Television, IPTV. The hybrid media receiver comprises: a content type receiver arranged to receive a first content type identifier and a second content type identifier, corresponding to the first broadcast media network and the second broadcast media network, respectively; and a channel data obtainer arranged to obtain, using the first content type identifier, a first list of scheduled media channels available to the hybrid media receiver over the first broadcast media network; and to obtain, using the second content type identifier, a second list of scheduled media channels available to the hybrid media receiver over the second broadcast media network. A corresponding middleware server, methods, computer programs and computer program products are also presented.

24 Claims, 6 Drawing Sheets

(51) Int. Cl.
  *H04N 21/462* (2011.01)
  *H04N 21/643* (2011.01)
  *H04L 29/06* (2006.01)
  *H04N 21/258* (2011.01)
  *H04N 21/472* (2011.01)
  *H04N 21/482* (2011.01)

(52) U.S. Cl.
  CPC ..... *H04N21/4622* (2013.01); *H04N 21/64322* (2013.01); *H04N 21/47202* (2013.01); *H04N 21/482* (2013.01)

(56) References Cited

U.S. PATENT DOCUMENTS

| | | | |
|---|---|---|---|
| 7,152,236 B1 | 12/2006 | Wugofski et al. | |
| 7,916,755 B2* | 3/2011 | Hasek | H04N 7/17318 370/464 |
| 7,987,182 B2* | 7/2011 | Slothouber | G06F 17/30867 707/722 |
| 8,027,659 B1* | 9/2011 | Daly | H04W 4/001 455/404.1 |
| 8,032,651 B2* | 10/2011 | Miner | G06F 17/3089 709/230 |
| 8,160,088 B2* | 4/2012 | Statelov | H04N 21/234327 370/431 |
| 8,667,387 B2* | 3/2014 | Sahota | 715/234 |
| 8,775,656 B2* | 7/2014 | Arora | H04L 12/2801 709/231 |
| 8,880,094 B2* | 11/2014 | Kurokawa | 455/404.1 |
| 2005/0210138 A1 | 9/2005 | Zigmond et al. | |
| 2005/0210145 A1* | 9/2005 | Kim et al. | 709/231 |
| 2006/0184990 A1 | 8/2006 | Kwak et al. | |
| 2007/0204311 A1 | 8/2007 | Hasek et al. | |
| 2008/0086569 A1 | 4/2008 | Arora et al. | |
| 2008/0126477 A1* | 5/2008 | Kim | H04L 65/4076 709/203 |
| 2008/0209489 A1* | 8/2008 | Joyce et al. | 725/111 |
| 2008/0226259 A1* | 9/2008 | Umetsu | H04N 5/765 386/292 |
| 2008/0282293 A1* | 11/2008 | Frechter | H04N 7/163 725/58 |
| 2009/0013361 A1* | 1/2009 | Oh | H04N 5/46 725/109 |
| 2009/0083824 A1* | 3/2009 | McCarthy | H04N 5/44591 725/151 |
| 2009/0158372 A1* | 6/2009 | You | H04N 7/165 725/110 |
| 2010/0162324 A1* | 6/2010 | Mehta | H04N 7/17318 725/61 |
| 2011/0072460 A1* | 3/2011 | Ryu | H04N 5/50 725/38 |
| 2011/0131332 A1* | 6/2011 | Bouazizi | H04L 65/1093 709/227 |

* cited by examiner

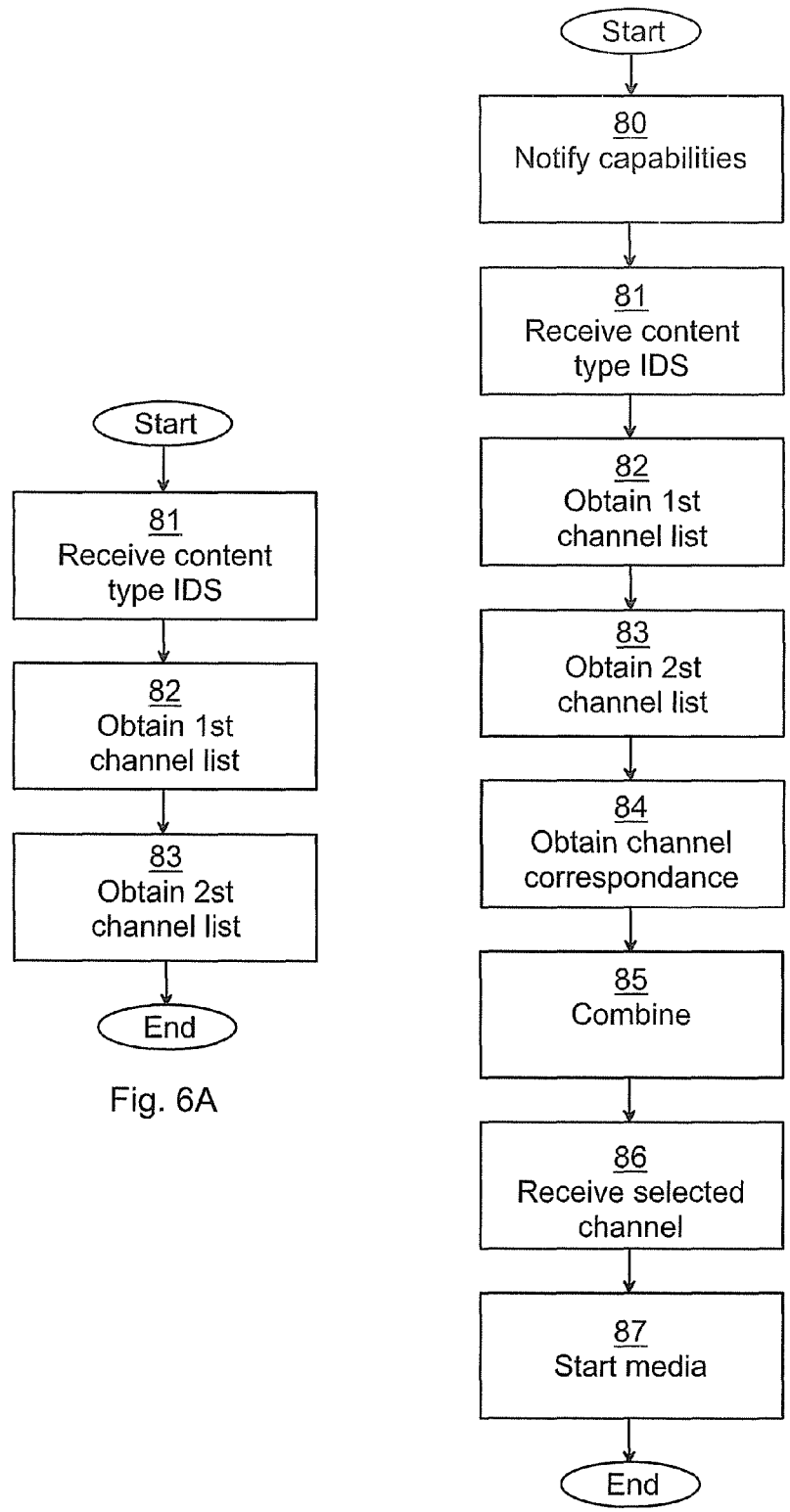

HYBRID MEDIA RECEIVER, MIDDLEWARE SERVER AND CORRESPONDING METHODS, COMPUTER PROGRAMS AND COMPUTER PROGRAM PRODUCTS

CROSS-REFERENCE TO RELATED APPLICATION

This application is a 35 U.S.C. §371 National Phase Entry Application from PCT/CN2011/072174, filed Mar. 25, 2011, and designating the United States.

TECHNICAL FIELD

The invention relates to media streaming and in particular media streaming over several network types.

BACKGROUND

Media streaming, such as IPTV (Internet Protocol Television) is gaining interest lately. IPTV allows the use of well defined IP networks for multicast or unicast streaming, which allows the reuse of many positive aspects of streaming over the Internet. Open IPTV Forum (OIPF) has defined a service discovery to support scheduled content service in IMS (Internet protocol Multimedia System) based IPTV networks, which re-uses the broadcast discovery defined in DVB-IP (Digital Video Broadcasting-Internet Protocol).

However, IPTV only supports IP based scheduled content service. It is thus not possible for hybrid media receivers to discover services for multiple networks, whereby installation of hybrid media receivers require tedious and error prone user input to be able to receive content from additional networks.

SUMMARY

It is thus an object to provide a way for a hybrid media receiver to discover broadcast services from several connected network types.

In a first aspect it is presented a hybrid media receiver capable of receiving broadcast media content using a first broadcast media network and a second broadcast media network, wherein the first broadcast media network complies with Internet Protocol Television, IPTV. The hybrid media receiver comprises: a content type receiver arranged to receive a first content type identifier and a second content type identifier, corresponding to the first broadcast media network and the second broadcast media network, respectively; and a channel data obtainer arranged to obtain, using the first content type identifier, a first list of scheduled media channels available to the hybrid media receiver over the first broadcast media network; and to obtain, using the second content type identifier, a second list of scheduled media channels available to the hybrid media receiver over the second broadcast media network. Using the two different types of content type identifiers, the service discovery of IPTV can be expanded to cover multiple broadcast media network types. This allows automatic discovery of connected network types.

The hybrid media receiver may further comprise a capability notifier arranged to notify a middleware server of capabilities of the hybrid media receiver to receive media content using the first broadcast media network and the second broadcast media network. This allows the middleware server to distinguish hybrid media receivers from single network media receivers, e.g. IPTV receivers, which improves the efficiency of the process and provides a solution where the legacy IPTV receivers are not disturbed by a new unknown content type identifier.

The hybrid media receiver may further comprise a channel combiner arranged to combine the first list and second list to a combined list of scheduled media channels available to the hybrid media receiver. This allows the user to see one list of media channels, where duplicate channels can be combined to one channel for the user.

The channel data obtainer may be arranged to obtain the first list of scheduled media channels by requesting a list of scheduled media channels from the middleware server with the first content type identifier; and to obtain the second list of scheduled media channels by requesting a list of scheduled media channels from the middleware server with the second content type identifier.

The hybrid media receiver may further comprise: a user interface module arranged to receive user input to view a selected scheduled media channel which is represented in both the first list and the second list; and a channel selector arranged to select a scheduled media channel of the broadcast media network corresponding to the list in which the selected scheduled media channel is indicated to be a preferred scheduled media channel. In other words, preferred channels or network can be configured. For example, a cable network can be configured to be preferred as the marginal resource requirement for a viewer is less than for IPTV.

A second aspect is a method for discovering available broadcast media channels, the method being executed in a hybrid media receiver capable of receiving broadcast media content using a first broadcast media network and a second broadcast media network, wherein the first broadcast media network complies with Internet Protocol Television, IPTV. The method comprises the steps of: receiving a first content type identifier and a second content type identifier, corresponding to the first broadcast media network and the second broadcast media network, respectively; obtaining, using the first content type identifier, a first list of scheduled media channels available to the hybrid media receiver over the first broadcast media network; and obtaining, using the second content type identifier, a second list of scheduled media channels available to the hybrid media receiver over the second broadcast media network.

The method may further comprise the step, prior to the step of receiving, of: notifying a middleware server of capabilities of the hybrid media receiver to receive media content using the first broadcast media network and the second broadcast media network.

The method may further comprise the step of: combining the first list and second list to a combined list of scheduled media channels available to the hybrid media receiver.

The second broadcast media network may comply with at least one of the standards in the group consisting of Digital Video Broadcasting-Cable, DVB-C; Digital Video Broadcasting-Satellite, DVB-S; and Digital Video Broadcasting-Terrestrial, DVB-T.

The method may further comprise the step of: receiving user input to view a selected scheduled media channel which is represented in both the first list and the second list; and initiating media receiving from the broadcast media network corresponding to the list in which the selected scheduled media channel is indicated to be a preferred scheduled media channel.

The step of notifying may comprise sending a session initiation protocol, SIP, SUBSCRIBE message, the SIP message comprising an ACCEPT header representing the first broadcast media network and an ACCEPT header representing the second broadcast media network. SIP can be used to be backwards compatible with current IPTV service discovery protocols.

The step of receiving a first content type identifier and a second content type identifier may comprise receiving a SIP NOTIFY message.

The step of receiving may comprise receiving a third content type identifier for channel correspondence; and the method may further comprise the step of: obtaining, using the third content type identifier, channel correspondence data, the channel correspondence data comprising mappings between a logical channel and two scheduled media channels of the first list and the second list, respectively. This provides a connection between corresponding, or duplicate, media channels to aid the making of a combined list.

The step of obtaining a first list of scheduled media channels may comprise obtaining the first list of scheduled media channels by requesting a list of scheduled media channels from the middleware server with the first content type identifier; and the step of obtaining a second list of scheduled media channels may comprise obtaining the second list of scheduled media channels by requesting a list of scheduled media channels from the middleware server with the second content type identifier.

A third aspect is a computer program for a hybrid media receiver capable of receiving broadcast media content using a first broadcast media network and a second broadcast media network, wherein the first broadcast media network complies with Internet Protocol Television, IPTV. The computer program comprises computer program code which, when run on the hybrid media receiver causes the media receiver to: receive a first content type identifier and a second content type identifier, corresponding to the first broadcast media network and the second broadcast media network, respectively; obtain, using the first content type identifier, a first list of scheduled media channels available to the hybrid media receiver over the first broadcast media network; and obtain, using the second content type identifier, a second list of scheduled media channels available to the hybrid media receiver over the second broadcast media network.

A fourth aspect is a computer program product comprising a computer program according to the third aspect and computer readable means on which the computer program is stored.

A fifth aspect is a middleware server for providing available broadcast media channels to a hybrid media receiver capable of receiving broadcast media content using a first broadcast media network and a second broadcast media network, wherein the first broadcast media network complies with Internet Protocol Television, IPTV. The middleware server comprises: a service provider discovery module arranged to receive a message notifying the capabilities of the hybrid media receiver to receive media content using the first broadcast media network and the second broadcast media network; and to send to the hybrid media receiver a first content type identifier and a second content type identifier, corresponding to the first broadcast media network and the second broadcast media network, respectively; and a service discovery module arranged to provide to the hybrid media receiver, when queried with the first content type identifier, a first list of scheduled media channels available to the hybrid media receiver over the first broadcast media network; and to provide to the hybrid media receiver, when queried with the second content type identifier, a second list of scheduled media channels available to the hybrid media receiver over the second broadcast media network.

A sixth aspect is a method for providing available broadcast media channels to a hybrid media receiver capable of receiving broadcast media content using a first broadcast media network and a second broadcast media network, wherein the first broadcast media network complies with Internet Protocol Television, IPTV. The method, executed in a middleware server, comprises the steps of: sending to the hybrid media receiver a first content type identifier and a second content type identifier, corresponding to the first broadcast media network and the second broadcast media network, respectively; providing to the hybrid media receiver, when queried with the first content type identifier, a first list of scheduled media channels available to the hybrid media receiver over the first broadcast media network; and providing to the hybrid media receiver, when queried with the second content type identifier, a second list of scheduled media channels available to the hybrid media receiver over the second broadcast media network.

The method may further comprise the step, prior to the step of sending, of: receiving a message notifying capabilities of the hybrid media receiver to receive media content using the first broadcast media network and the second broadcast media network.

The second broadcast media network may comply with at least one of the standards in the group consisting of Digital Video Broadcasting-Cable, DVB-C; Digital Video Broadcasting-Satellite, DVB-S; and Digital Video Broadcasting-Terrestrial, DVB-T.

The step of receiving may comprise receiving a session initiation protocol, SIP, SUBSCRIBE message, the SIP message comprising an ACCEPT header representing the first broadcast media network and an ACCEPT header representing the second broadcast media network.

The step of sending a first content type identifier and a second content type identifier may comprise sending a SIP NOTIFY message.

The step of sending may further comprise: sending a third content type identifier for channel correspondence; and the method may further comprise the step of: providing to the hybrid media receiver, when queried with the third content type identifier, channel correspondence data, the channel correspondence data comprising mappings between a logical channel and two scheduled media channels of the first list and the second list, respectively.

A seventh aspect is a computer program for a media middleware server to provide available broadcast media channels to a hybrid media receiver capable of receiving broadcast media content using a first broadcast media network and a second broadcast media network, wherein the first broadcast media network complies with Internet Protocol Television, IPTV. The computer program comprises computer program code which, when run on the media middleware server causes the media middleware server to: send to the hybrid media receiver a first content type identifier and a second content type identifier, corresponding to the first broadcast media network and the second broadcast media network, respectively; provide to the hybrid media receiver, when queried with the first content type identifier, a first list of scheduled media channels available to the hybrid media receiver over the first broadcast media network; and provide to the hybrid media receiver, when queried with the second content type identifier, a second list of scheduled media channels available to the hybrid media receiver over the second broadcast media network.

An eighth aspect is a computer program product comprising a computer program according to the seventh aspect and computer readable means on which the computer program is stored.

It is to be noted that any feature of the first, second, third, fourth, fifth, sixth, seventh and eighth aspects may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 6A and 6B are flow charts illustrating embodiments of a method implemented in a hybrid media receiver of FIG. 1.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
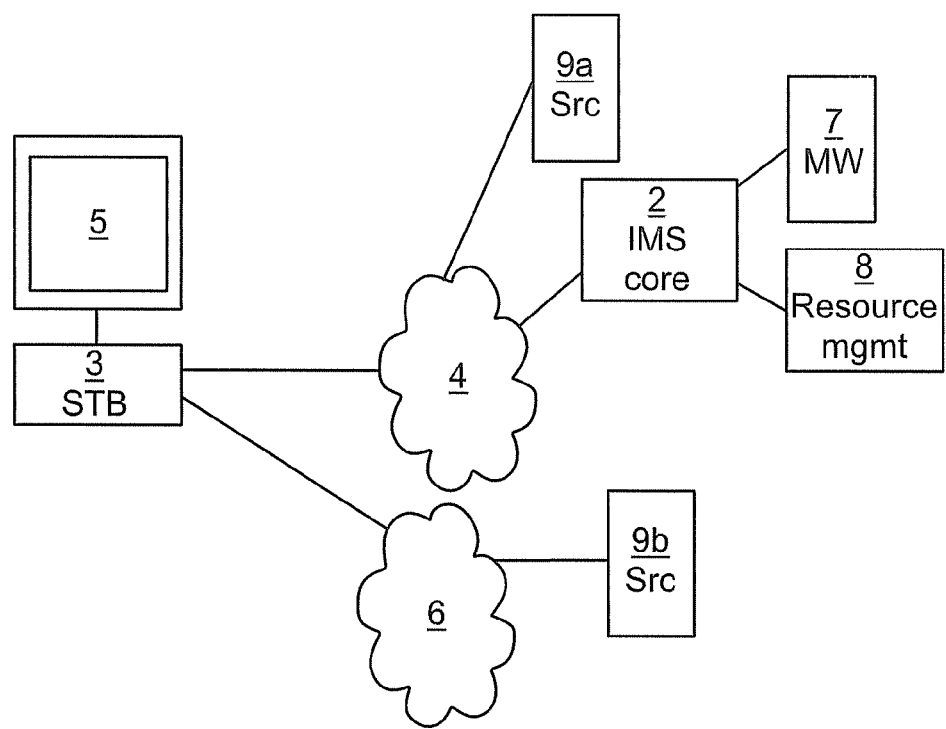
FIG. 1 is a schematic diagram showing an overview of an environment where media streaming in embodiments can be applied.

FIG. 1 is a schematic diagram showing an overview of an environment where content delivery in embodiments can be applied. A first media source 9a is connected to a first broadcast media network 4 being an IP (Internet Protocol) network to allow delivery of scheduled streaming media (i.e. broadcast content) to hybrid media receivers 3. A second media source 9b is connected to a second broadcast media network 6 which can be a cable television network (e.g. conforming to DVB-C, Digital Video Broadcasting-Cable) to allow delivery of streaming media to hybrid media receivers 3. The IP network 4 is configured to allow media delivery according to the IPTV (IP television) standard. Each hybrid media receiver 3 is connected to both the IP network 4 and the cable television network 6. Each hybrid media receiver 3 can be embodied in a set top box, computer, television, or any other type of device capable of receiving streaming content from the media server via both the IP network 4 and the cable television network 6. Each hybrid media receiver 3 is also connected to a respective display 5, such as a television any other device capable of presenting the content in the form of video and/or audio from the media server.

The media sources 9a-b can broadcast media sources, e.g. received using satellite television reception, cable television reception, etc. The media sources 9a-b comprise hardware and/or software to allow the broadcast media content to be transferred over the IP network 4 and cable television network 6, respectively, to the hybrid media receivers 3.

While the IP network 4 and the cable television network 6 are here depicted as two separate networks, the IP network 4 can be implemented using the cable television network 6 for delivery to the hybrid media receivers 3, as known per se. In other words, the IP network 4 and the cable television network 6 can substantially share the same physical network. In particular in the part of the network that is closer to the hybrid media receiver, the IP network 4 and the cable television 6 network may share the same physical network.

Optionally, the first broadcast media network 4 complies with IMS (IP Multimedia System). In this case, a core network 2 is connected to the IP network 4 and is responsible for core functions in accordance with the IMS specifications.

A middleware server 7 is also connected to the IP network 4. If IMS is used, the connection is effected via the IMS core network 2. If IMS is not used, the middleware server 7 is connected directly to the IP network 4. Optionally, the IMS core network 2 is also connected to a resource management device 8.

One task of the middleware server 7 is to provide, when queried by the hybrid media receivers 3, lists of scheduled media channels which are available to the hybrid media receivers 3.

Figure 2:
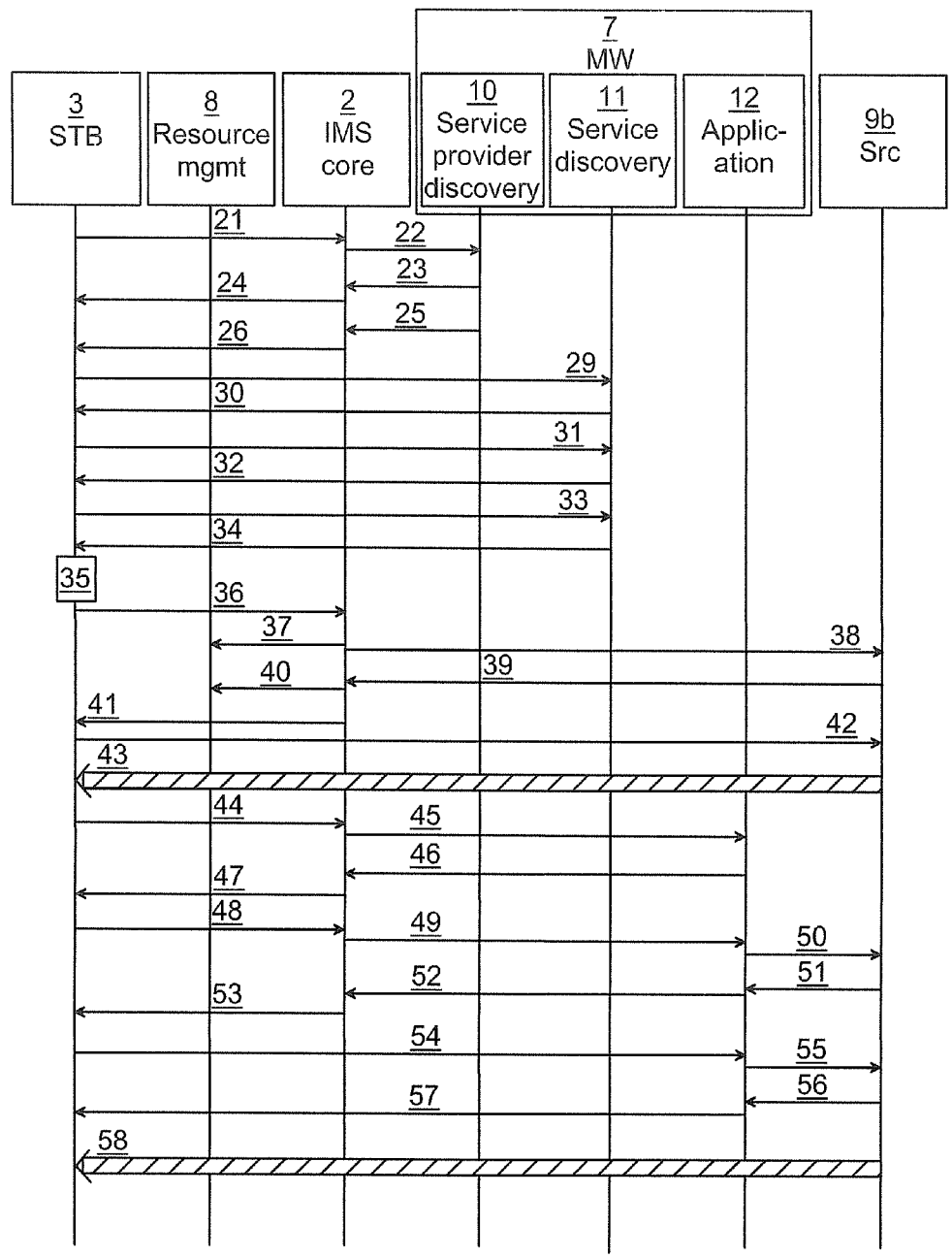
FIG. 2 is a sequence diagram illustrating communication in embodiments of FIG. 1.

FIG. 2 is a sequence diagram illustrating communication in embodiments of FIG. 1. This will now be described in detail with some references also to FIG. 1.

Prior to this process starting, the middleware server 7 obtains access information of scheduled media channels available both on the IP network 4 and the cable network 6, optionally for a plurality of content providers for each network. This access information can, for example, include frequency, program number for the cable television network 6 and server address, port, etc. for the IP network 4.

This sequence starts by the hybrid media receiver 3 sending 21 a SIP SUBSCRIBE message to the IMS core 2 which forwards 22 the SIP SUBSCRIBE message to a service provider discovery module 10 of the middleware server 7. The SIP SUBSCRIBE message allows the hybrid media receiver 3 to receive service provider information from the middleware server 7.

In the SIP SUBSCRIBE message, the hybrid media receiver 3 specifies its capabilities in Accept headers. It is known, per se, to have the following values in accept headers: "application/oipf-iptvspdiscovery+xml" for OIPF version 1.0, "application/vnd.oipf.spdiscovery+xml" for OIPF version 1.1, and "text/xml" for OIPF 1.0 version.

When the service provider discovery module 10 receives the SIP SUBSCRIBE request with any of the above values in the Accept header, a payload identity parameter of "02" is returned to the hybrid media receiver 3 to indicate to the hybrid media receiver 3 to request broadcast discovery data using this particular payload identity. The payload identity can also be called content type identifier in this document. The broadcast discovery entity with payload identity "02" is known per se.

In embodiments herein, a new value for the accept header is introduced for hybrid broadcast discovery. This accept header can for example be "application/x-vnd.oipf.spdiscoveryhybrid+xml".

When the service provider discovery module 10 receives the SIP SUBSCRIBE request with "application/x-vnd.oipf.spdiscoveryhybrid+xml" in the Accept header, it responds with a payload identifier coupled to hybrid broadcast discover. As an example, a payload identity of "F0" can be used. This will allow the hybrid media receiver 3 to request the hybrid broadcast discovery data. Additionally, payload identifier "02" can optionally also be returned to the hybrid media receiver 3 to indicate to the hybrid media receiver 3 to request broadcast discovery data. Optionally, a separate package discovery payload identifier can be returned to the hybrid media receiver 3 to allow the hybrid media receiver 3 to request package discovery data. In this example, the package discovery payload identifier is set to "05".

The service provider discovery module 10 responds 23 with a SIP OK message to the IMS core 2 which forwards 24 to the hybrid media receiver 3.

Subsequently, the service provider discovery module 10 sends 25 a SIP NOTIFY message to the IMS core 2 for forwarding 26 to the hybrid media receiver 3. The SIP NOTIFY message comprises the payload identifier or payload identifiers as described above. The SIP NOTIFY message can comprise several payload identifiers for several networks of the same type. For example, there could be a first payload id 02 for IPTV network A and a second payload id 02 for IPTV network B. The equivalent can apply for the cable television network.

Once the payload identifiers have been received in the hybrid media receiver 3, the hybrid media receiver 3 requests 29 broadcast discovery data using an HTTP request to a service discovery module 11 of the middleware server 7 IPTV MW. In the HTTP request, a payload identifier "02" is used if the hybrid media receiver 3 would like to retrieve the IP network data.

As a response to the payload identifier "02", The service discover module then determines the broadcast discovery data which includes a list of all scheduled media channels available to the hybrid media receiver 3 over the IP network 4 and sends 30 this back in an HTTP response. Also, data for how to access each channel is included, such as address, port, etc.

The broadcast discover data can in one example have the following construction:

```
<?xml version="1.0" encoding="UTF-8"?>
<sdns:ServiceDiscovery Version="0"
xsi:schemaLocation="urn:oipf:service:sdns:2008 service-
sdns.xsd" xmlns:xsi="http://www.w3.org/2001/XMLSchema-
instance" xmlns:dvb="urn:dvb:ipi:sdns:2006"
xmlns:sdns="urn:oipf:service:sdns:2008">
    <BroadcastDiscovery xmlns="" DomainName="iap.ericsson.com"
Version="54">
        <dvb:ServiceList>
            <dvb:SingleService isPreferredChannel="false">
                <dvb:ServiceLocation>
                    <dvb:IPMulticastAddress Port="11111"
Address="239.0.0.31"/>
                </dvb:ServiceLocation>
                <dvb:TextualIdentifier ServiceName="Channel1"/>
                <dvb:DVBTriplet ServiceId="0" TSId="0"
OrigNetId="0"/>
                <dvb:MaxBitrate>1500</dvb:MaxBitrate>
                <TimeToRenegotiate>TP6M</TimeToRenegotiate>
            </dvb:SingleService>
            <dvb:SingleService
```

```
isPreferredChannel="false"xsi:type="sdns:IPService">
                <dvb:ServiceLocation>
                    <dvb:IPMulticastAddress Port="11111"
Address="239.0.0.32"/>
                </dvb:ServiceLocation>
                <dvb:TextualIdentifier ServiceName="Channel2"/>
                <dvb:DVBTriplet ServiceId="0" TSId="0"
OrigNetId="0"/>
                <dvb:MaxBitrate>600</dvb:MaxBitrate>
                <TimeToRenegotiate>TP3M</TimeToRenegotiate>
            </dvb:SingleService>
        </dvb:ServiceList>
    </BroadcastDiscovery>
</sdns:ServiceDiscovery>
```

Analogously, the hybrid media receiver 3 requests 31 hybrid broadcast discovery data using an HTTP request to IPTV MW with PayloadId "F0" for the hybrid media receiver 3 to retrieve data for the cable network, such as DVB-C frequency, program number, modulation, transport stream ID, symbol rate, etc. This data is organised in a list of scheduled media channels for the cable television network 6.

The hybrid broadcast discover data can in one example have the following construction:

```
<?xml version="1.0" encoding="UTF-8"?>
<sdns:ServiceDiscovery
xmlns:sdns="urn:oipf:service:sdns:2010:hybrid"
xmlns:dvb="urn:dvb:metadata:iptv:sdns:2008-1"
xmlns:xsi="http://www.w3.org/2001/XMLSchema-instance"
xsi:schemaLocation="urn:oipf:service:sdns:2010:hybrid
service-sdns_v11_hybrid.xsd ">
    <sdns:HybridBroadcastDiscovery
DomainName="iap.ericsson.com" Version="54">
        <sdns:DVBCServiceList>
            <sdns:DVBCService isPreferredChannel="true">
                <sdns:TextualIdentifier ServiceName="Channel1" />
                <sdns:DVBCQAM Frequency="780"
                ProgramNumber="10"
ModulationType="3" TSId="00005" SymbolRate="0068750"/>
            </sdns:DVBCService>
            <sdns:DVBCService isPreferredChannel="true">
                <sdns:TextualIdentifier ServiceName="Channel2" />
                <sdns:DVBCQAM Frequency="788"
                ProgramNumber="10"
ModulationType="3" TSId="00005" SymbolRate="0068750"/>
            </sdns:DVBCService>
        </sdns:DVBCServiceList>
    </sdns:HybridBroadcastDiscovery>
</sdns:ServiceDiscovery>
```

The service discovery module thus sends 32 this hybrid broadcast discovery data back to the hybrid media receiver 3 in an HTTP response.

Optionally, if package discovery is performed, the hybrid media receiver 3 requests 33 package discovery data using an HTTP request to the service discovery module 11 using a payload identifier of "05". This will make the service discovery module 11 determine the package discovery data and send 34 this back in an HTTP response. The package discovery data contains logical channel number data, which could be used by the hybrid media receiver 3 to indicate the channel number in EPG or when consolidating channel lists from several networks.

Subsequently, the hybrid media receiver 3 consolidates 35 all service access information e.g. using domain name and service name. E.g., combine the service access information for the same logical channel from the hybrid network. The domain name can indicate the service provider, whereby this can be used to identify the same service provider across several network types, such as IPTV and cable television.

The broadcast discovery data is used to access the IP network based scheduled content service, the hybrid broadcast discovery data is used to access the scheduled content service in the hybrid network. e.g. frequency, QAM (Quadrature Amplitude Modulation) data could be used to tune to the target channel in the cable television network. Finally, the package discovery data is used to couple logical channel numbers with the channels in the channel lists for the IP network and/or the cable television network.

With the consolidated hybrid service access information, the hybrid media receiver 3 has now discovered both networks 4, 6 and is in a position to make a decision on which network to use to access a scheduled content service. This decision can optionally be performed based on a "is PreferredChannel" attribute included for channels in the broadcast discovery data and the hybrid broadcast discovery data as seen in the example messages above.

In one embodiment, if the cable television network 6 and IP network 4 are available for scheduled content service, the cable television network 6 could be preferred network to access the scheduled content service. Optionally, when the hybrid media receiver 3 detects that there is some fault on the cable television network 6 or there is other need to use IP network to access the scheduled content service, the hybrid media receiver 3 could switch to the IP network dynamically, to access the corresponding channel over the IP network.

Analogously, it is possible for the hybrid media receiver 3 to first use the IP network 4 to access the scheduled content service, and then switch to the cable television network 6 if needed.

Once the services for the hybrid media receiver 3 including all channels have been discovered, the hybrid media receiver 3 can initiate a SIP session in order to access the scheduled content service. This is done by the hybrid media receiver 3 sending 36 a SIP INVITE message to the IMS core 2. Optionally, the IMS core 2 requests 37 a resource reservation with the resource management device 8, after which the SIP INVITE message is forwarded 38 to an application module 12 of the middleware server 7.

Once the application module 12 responds 39 to the IMS core 2 with a SIP OK message, the IMS core optionally commits 40 the resource reservation with the resource management device 8. At this point, the SIP OK message can also be forwarded 41 to the hybrid media receiver 3.

Depending on the specific hybrid network, the resource reservation and resource commit may not be needed. For example, it is not needed to perform resource reservation and resource commit when accessing scheduled content service in the cable network.

The hybrid media receiver 3 now connects 42 to the media source 9b and the media source 9b transmits 43 the actual content in to the hybrid media receiver 3.

Optionally, while receiving content, the hybrid media receiver 3 sends 44 current channel information to the application module 12 in a SIP INFO message. This can include domain name and service name of the hybrid broadcast discovery data. The domain name and service name can be used when activating a time shift TV application for the scheduled content service. This is only required for IP network content. In other cases, the information can be collected with HTTP communication between a browser in the hybrid media receiver 3 and the middleware server 7. The browser implements the user interface of the hybrid media receiver. If the SIP INFO message is sent, the application module 12 responds 46 with a SIP OK message to the IMS core 2 which forwards 47 the SIP OK message to the hybrid media receiver 3.

If time shift is activated, the hybrid media receiver 3 sends 48 a SIP INVITE message to the IMS core 2 which forwards 49 the SIP INVITE message to the application module 12. The application module 12 then initiates an RTSP (Real Time Streaming Protocol) by sending 50 an RTSP SETUP message to the content source Pb (which may be the same or a different (not shown) content source compared to previous content streaming). The content source 9b responds 51 with an RTSP OK message, after which the application module 12 sends 52 a SIP OK message to the IMS core 2 which forwards 53 the SIP OK message to the hybrid media receiver 3.

The hybrid media receiver 3 is now ready to start the playback of the time shifted stream by sending 54 an RTSP PLAY message to the application module 12 which forwards 55 the RTSP PLAY message to the content source 9b. The content source 9b responds 56 with an RTSP OK message to the application module 12, whereby the application module 12 forwards 57 the RTSP OK message to the hybrid media receiver 3. This will trigger the media source 9b to stream 58 the time shifted content to the hybrid media receiver 3.

It is to be noted that the sequence above can also be implemented without the IMS core 2. The IMS core 2 is only used in this context for resource reservation, and if this is not required or solved in other ways, the IMS core 2 can be removed. For all other communication disclosed above, the IMS core 2 is only used for forwarding messages.

Figure 3A:
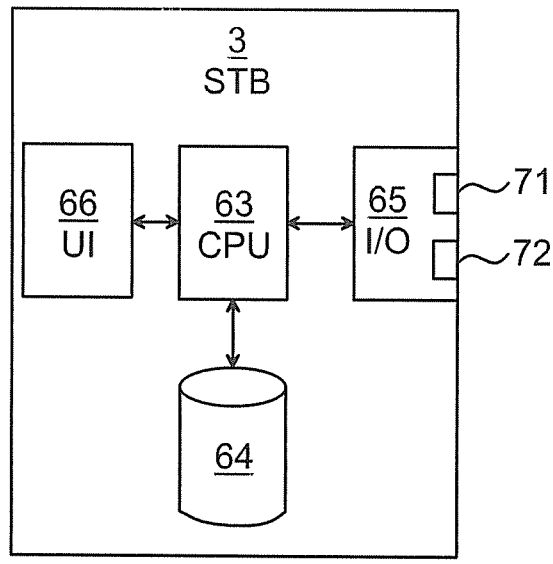
FIG. 3a is a schematic diagram showing components of a hybrid media receiver of FIG. 1.

FIG. 3a is a schematic diagram showing components of the hybrid media receiver of FIG. 1. A controller 63 is provided using any suitable central processing unit (CPU), microcontroller, digital signal processor (DSP), etc., capable of executing software instructions stored in a computer readable media 64, e.g., memory. The computer readable media 64 can be any combination of read and write memory (RAM) and read only memory (ROM). The computer readable media 64 also comprises persistent storage, which, for example, can be any single one or combination of magnetic memory, optical memory, or solid state memory.

An input/output (I/O) interface 65 is provided to allow the hybrid media receiver 3 receive content and communicate with the middleware server 7 (optionally via the IMS core). The I/O interface 65 can be provided with two ports 71, 72, being one cable television connector 71 and one network connector 72, such as an Ethernet connector. Optionally, the cable television connector 71 is only provided, whereby both IP traffic and cable television content is provided using a single physical connection between the hybrid media receiver 3 and the cable television network 6. In other words, the cable television connector 71 can be a single physical port of the hybrid media receiver 3 arranged to connect to both the IP network 4 and the cable television network 6.

A user interface 66 is provided to allow a user to interact with the hybrid media receiver 3. The user interface 66 can comprise the use of the display 5 and an infrared or radio frequency remote control. The user interface can, for example, be implemented using a web browser running in the hybrid media receiver 3 which is in contact with the application module of the middleware server. Alternatively or additionally, some user interface components are natively part of the hybrid media receiver 3 and receive data as required from the network(s).

Figure 3B:
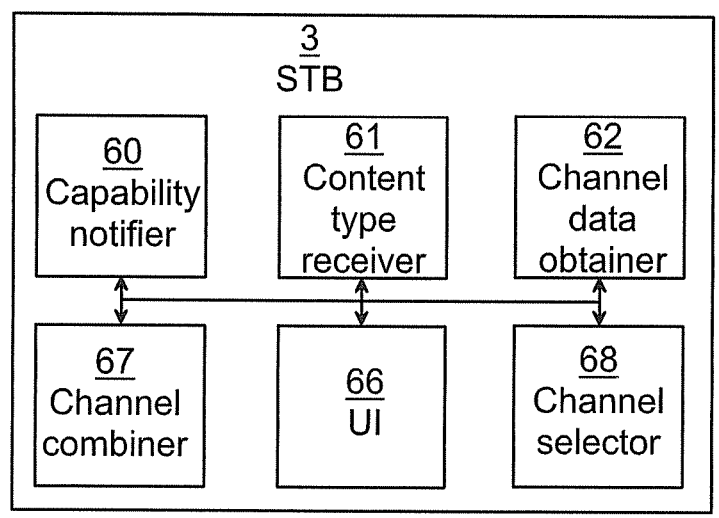
FIG. 3b is a schematic diagram showing functional modules of a hybrid media receiver of FIG. 1.

FIG. 3b is a schematic diagram showing functional modules of the hybrid media receiver of FIG. 1. The modules can be implemented using software such as a computer program executing in the hybrid media receiver 3. All modules depend on an execution environment which can utilise the controller 63, computer program product 64 and I/O interface 65 of FIG. 3a. The modules implement communication of the hybrid media receiver 3 of FIG. 2.

A content type receiver 61 is arranged to receive a first content type identifier (or payload identifier) and a second content type identifier. These correspond to the IP network 4 and the cable television network 6, respectively. In the examples with reference to FIG. 2 above, the content type identifiers are "02" and "F0" respectively.

A channel data obtainer 62 is arranged to obtain, using the first content type identifier, a first list of scheduled media channels available to the hybrid media receiver 3 over the IP network 4; and to obtain, using the second content type identifier, a second list of scheduled media channels available to the hybrid media receiver 3 over the cable television network 6.

A capability notifier 60 is arranged to notify the middleware server 7 of capabilities of the hybrid media receiver 3 to receive media content using IP network 4 and the cable television network 6.

A channel combiner 67 is arranged to combine the first list and second list to a combined list of scheduled media channels available to the hybrid media receiver 3.

A user interface module 66 is arranged to receive user input to view a selected scheduled media channel which is represented in both the first list and the second list.

A channel selector 68 is arranged to select a scheduled media channel of the network corresponding to the list in which the selected scheduled media channel is indicated to be a preferred scheduled media channel.

Figure 4A:
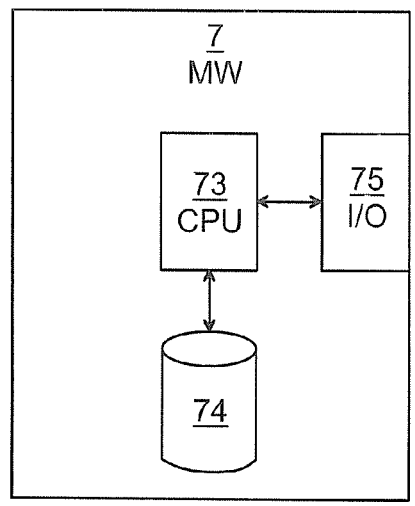
FIG. 4a is a schematic diagram showing components of a middleware server of FIG. 1.

FIG. 4a is a schematic diagram showing components of a middleware server of FIG. 1.

A controller 73 is provided using any suitable central processing unit (CPU), microcontroller, digital signal processor (DSP), etc., capable of executing software instructions stored in a computer readable media 74, e.g., memory. The computer readable media 74 can be any combination of read and write memory (RAM) and read only memory (ROM). The computer readable media 74 also comprises persistent storage, which, for example, can be any single one or combination of magnetic memory, optical memory, or solid state memory.

An input/output interface 75 is provided to allow the middleware server 7 to communicate with other entities such as the hybrid media receivers 3 and optionally the IMS core 2.

A local user interface (not shown) is optionally provided to allow a user to interact with the middleware server 7. The user interface can include a display and an input device such as a keyboard, a touch function of the display and/or a positional input device such as a mouse, trackball, etc.

Figure 4B:
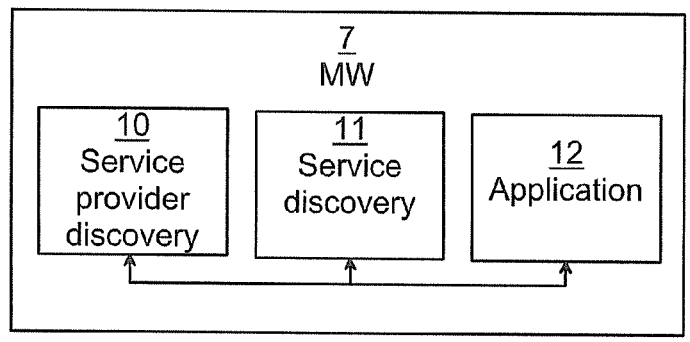
FIG. 4b is a schematic diagram showing functional modules of the middleware server FIG. 1.

FIG. 4b is a schematic diagram showing functional modules of the middleware server FIG. 1. The modules can be implemented using software such as a computer program executing in the middleware server 7. All modules depend on an execution environment which can utilise the controller 73, computer program product 74 and I/O interface 75 of FIG. 4a. The modules implement communication of the middleware server 7 of FIG. 2.

The service provider discovery module 10 is arranged to receive a message notifying the capabilities of the hybrid media receiver 3 to receive media content using the IP network 4 and the cable television network 6. The service provider discovery module 10 is also arranged to send, to the hybrid media receiver 3, a first content type identifier and a second content type identifier, corresponding to the IP network 4 and the cable television network 6, respectively.

In the examples with reference to FIG. 2 above, the content type identifiers are "02" and "F0" respectively. The purpose of the service provider discovery module is to provide available service providers to hybrid media receivers in the process of discovering service providers.

The service discovery module 11 is arranged to provide, to the hybrid media receiver 3, when queried with the first content type identifier, a first list of scheduled media channels available to the hybrid media receiver 3 over the IP network 4. Furthermore, the service discovery module is arranged to provide to the hybrid media receiver 3, when queried with the second content type identifier, a second list of scheduled media channels available to the hybrid media receiver 3 over the cable television network 6.

The application module 12 is arranged to provide a web interface to the web browser of the user interface of the hybrid media receiver 3. Furthermore, the application module 12 acts as a gateway between SIP and RTSP when necessary.

Figure 5:
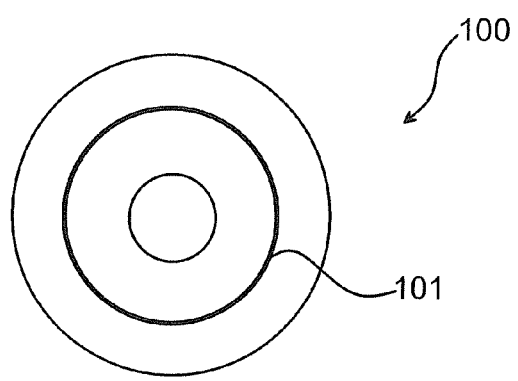
FIG. 5 shows one example of a computer program product comprising computer readable means.

FIG. 5 shows one example of a computer program product comprising computer readable means. On this computer readable means a computer program 101 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 64 of the hybrid media receiver 3 or memory 74 of the middleware server 7. While the computer program 101 is here schematically shown as a track on the depicted optical disk, the computer program can be stored in any way which is suitable for the computer program product.

FIGS. 6A and 6B are flow charts illustrating embodiments of a method implemented in a hybrid media receiver of FIG. 1. The method implements the messaging of the hybrid media receiver 3 in FIG. 2. The method can be executed by the computer program of the computer program product. Firstly, the embodiment according to FIG. 6A will be described.

In an initial receive content type IDs step 81, the hybrid media receiver 3 receives a first content type identifier and a second content type identifier, corresponding to the IP network 4 and the cable television network 6, respectively.

In an obtain first channel list step 82, the hybrid media receiver 3 obtains, using the first content type identifier, a first list of scheduled media channels available to the hybrid media receiver 3 over the IP network 4.

In an obtain second channel list step 82, the hybrid media receiver 3 obtains, using the second content type identifier, a second list of scheduled media channels available to the hybrid media receiver 3 over the cable television network 6.

Secondly, the embodiment according to FIG. 6B will be described. Here, the initial step is a notify capabilities step 80, where the hybrid media receiver 3 notifies 80 a middleware server 7 of capabilities of the hybrid media receiver 3 to receive media content using the IP network 4 and the cable television network 6.

The steps 81-83 correspond to the steps of FIG. 6A. However, in step 81, the media receiver 3 also receives a third content type identifier for channel correspondence.

After step 83, a obtain channel correspondence step 84 is executed. Here, the hybrid media receiver 3 obtains, using the third content type identifier, channel correspondence data, where the channel correspondence data comprises mappings between a logical channel and two scheduled media channels of the first list and the second list, respectively.

In a combine step 85, the hybrid media receiver combines the first list and second list to a combined list of scheduled media channels available to the hybrid media receiver 3, optionally using the channel correspondence data.

In a receive selected channel step 86, the hybrid media receiver 3 receives user input to view a selected scheduled media channel which is represented in both the first list and the second list.

In a start media step 87, the hybrid media receiver 3 initiates media receiving from the broadcast media network corresponding to the list in which the selected scheduled media channel is indicated to be a preferred scheduled media channel. Selection of network can also occur using other criteria as described above.

Figure 7A:
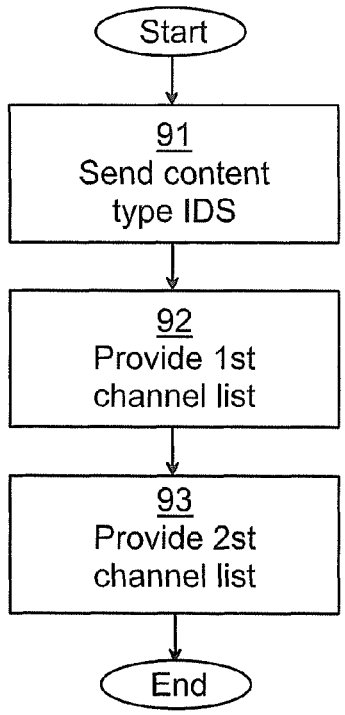
FIGS. 7A and 7B are flow charts illustrating embodiments of a method implemented in a middleware server of FIG. 1.
Figure 7B:
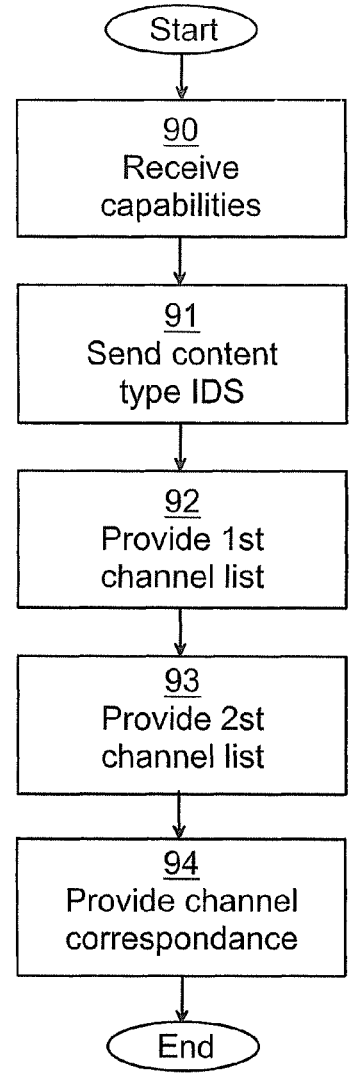

FIGS. 7A and 7B are flow charts illustrating embodiments of a method implemented in a middleware server of FIG. 1. The method implements the messaging of the middleware server 7 in FIG. 2. The method can be executed by the computer program of the computer program product. Firstly, the embodiment according to FIG. 7A will be described.

In a send content type IDs step 91, the middleware server sends, to the hybrid media receiver 3 a first content type identifier and a second content type identifier, corresponding to the IP network 4 and the cable television network 6, respectively.

In a provide first channel list step 92, the middleware server 7 provides, to the hybrid media receiver 3, when queried with the first content type identifier, a first list of scheduled media channels available to the hybrid media receiver 3 over the IP network 4

In a provide second channel list step 93, the middleware server 7 provides, to the hybrid media receiver 3, when queried with the second content type identifier, a second list of scheduled media channels available to the hybrid media receiver 3 over the cable television network 6.

Now the embodiment according to FIG. 7B will be described.

Initially, in a receive capabilities step, the middleware server 7 receives a message notifying capabilities of the hybrid media receiver 3 to receive media content using the IP network 4 and the cable television network 6.

The steps 91-93 correspond to the steps of FIG. 7A. However, in step 91, the middleware server 7 also sends a third content type identifier for channel correspondence.

In a provide channel correspondence step 94, the middleware server provides, to the hybrid media receiver 3, when queried with the third content type identifier, channel correspondence data, the channel correspondence data comprising mappings between a logical channel and two scheduled media channels of the first list and the second list, respectively.

It is to be noted that while the second broadcast media network 6 of FIG. 1 has here been disclosed as being a cable television network, this network could equally well be a satellite broadcasting network, e.g. complying with DVB-S (Digital Video Broadcast-Satellite), a terrestrial broadcasting network, e.g. complying with DVB-T (Digital Video Broadcast-Terrestrial), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A hybrid media receiver capable of receiving broadcast media content using a first broadcast media network and a second broadcast media network that is different than the first broadcast media network, wherein the first broadcast media network complies with Internet Protocol Television, IPTV, the hybrid media receiver comprising:

a content type receiver arranged to receive a first payload identifier corresponding to the first broadcast media network and a second payload identifier corresponding to the second broadcast media network, wherein the second payload identifier is separate and distinct from the first payload identifier; and a channel data obtainer arranged to obtain, using the first payload identifier, a first list of scheduled media channels available to the hybrid media receiver over the first broadcast media network; and to obtain, using the second payload identifier, a second list of scheduled media channels available to the hybrid media receiver over the second broadcast media network, wherein the channel data obtainer is arranged to obtain the first list of scheduled media channels by transmitting to a middleware server a first request for a list of scheduled media channels associated with the first payload identifier, the first request including the first payload identifier, whereby the middleware server is configured such that, in response to receiving the first request comprising the first payload identifier, the middleware server determines the first list of scheduled media channels available to the hybrid media receiver and sends to the hybrid media receiver a first response message comprising said first list of scheduled media channels, and the channel data obtainer is arranged to obtain the second list of scheduled media channels by transmitting to said middleware server a second request for a list of scheduled media channels associated with the second payload identifier, the second request including the second payload identifier, whereby the middleware server is configured such that, in response to receiving the second request comprising the second payload identifier, the middleware server determines the second list of scheduled media channels available to the hybrid media receiver and sends to the hybrid media receiver a second response message comprising said second list of scheduled media channels.

2. The hybrid media receiver according to claim 1, further comprising a capability notifier arranged to notify a middleware server of capabilities of the hybrid media receiver to receive media content using the first broadcast media network and the second broadcast media network.

3. The hybrid media receiver of claim 2, wherein the hybrid media server communicates with the middleware server via an IMS core and a broadcast network.

4. The hybrid media receiver according to claim 1, further comprising a channel combiner arranged to combine the first list and second list to a combined list of scheduled media channels available to the hybrid media receiver.

5. The hybrid media receiver according to claim 1, further comprising:

a user interface module arranged to receive user input to view a selected scheduled media channel which is represented in both the first list and the second list; and a channel selector arranged to select a scheduled media channel of the broadcast media network corresponding to the list in which the selected scheduled media channel is indicated to be a preferred scheduled media channel.

6. A method for discovering available broadcast media channels, the method being executed in a hybrid media receiver capable of receiving broadcast media content using a first broadcast media network and a second broadcast media network, wherein the first broadcast media network complies with Internet Protocol Television, IPTV, the method comprising the steps of:

notifying a middleware server of capabilities of the hybrid media receiver to receive media content using the first broadcast media network and the second broadcast media network;

as a result of notifying the middleware server, receiving from the middleware server a first content type identifier corresponding to the first broadcast media network and a second content type identifier corresponding to the second broadcast media network;

obtaining, using the first content type identifier, a first list of scheduled media channels available to the hybrid media receiver over the first broadcast media network; and obtaining, using the second content type identifier, a second list of scheduled media channels available to the hybrid media receiver over the second broadcast media network, wherein the step of notifying the middleware server comprises sending a session initiation protocol (SIP) SUBSCRIBE message, the SIP SUBSCRIBE message comprising an ACCEPT header representing the first broadcast media network and an ACCEPT header representing the second broadcast media network.

7. The method according to claim 6, further comprising the step of:

combining the first list and second list to a combined list of scheduled media channels available to the hybrid media receiver.

8. The method according to claim 6, wherein the second broadcast media network complies with at least one of the standards in the group consisting of Digital Video Broadcasting-Cable, DVB-C; Digital Video Broadcasting-Satellite, DVB-S; and Digital Video Broadcasting-Terrestrial, DVB-T.

9. The method according to claim 6, further comprising the step of:

receiving user input to view a selected scheduled media channel which is represented in both the first list and the second list; and initiating media receiving from the broadcast media network corresponding to the list in which the selected scheduled media channel is indicated to be a preferred scheduled media channel.

10. The method according to claim 6, wherein the step of receiving a first payload identifier and a second payload identifier comprises receiving a SIP NOTIFY message.

11. The hybrid media receiver of claim 10, wherein the SIP NOTIFY message is sent based on receiving a SIP OK message sent by a middleware server.

12. The hybrid media receiver of claim 10, wherein the SIP NOTIFY message includes one or more payload identifiers that are associated with one or more broadcast networks.

13. The hybrid media receiver of claim 12, wherein the hybrid media receiver sends a broadcast discovery data request to the middleware server based on receiving the one or more payload identifiers.

14. The method according to claim 6, wherein the step of receiving comprises receiving a third payload identifier for channel correspondence;

and wherein the method further comprises the step of:

obtaining, using the third payload identifier, channel correspondence data, the channel correspondence data comprising mappings between a logical channel and two scheduled media channels of the first list and the second list, respectively.

15. The method according to claim 6, wherein the step of obtaining a first list of scheduled media channels comprises obtaining the first list of scheduled media channels by requesting a list of scheduled media channels from the middleware server with the first payload identifier; and the step of obtaining a second list of scheduled media channels comprises obtaining the second list of scheduled media channels by requesting a list of scheduled media channels from the middleware server with the second payload identifier.

16. A computer program product comprising a non-transitory computer readable medium storing a computer program for a hybrid media receiver capable of receiving broadcast media content using a first broadcast media network and a second broadcast media network, wherein the first broadcast media network complies with Internet Protocol Television, IPTV, the computer program comprising computer program code which, when run on the hybrid media receiver causes the hybrid media receiver to:

receive a first payload identifier and a second payload identifier, corresponding to the first broadcast media network and the second broadcast media network, respectively;

obtain, using the first payload identifier, a first list of scheduled media channels available to the hybrid media receiver over the first broadcast media network by transmitting to a middleware server a first request for a list of scheduled media channels associated with the first payload identifier, the first request including the first payload identifier, whereby the middleware server is configured such that, in response to receiving the first request comprising the first payload identifier, the middleware server determines the first list of scheduled media channels available to the hybrid media receiver and sends to the hybrid media receiver a first response message comprising said first list of scheduled media channels; and obtain, using the second payload identifier, a second list of scheduled media channels available to the hybrid media receiver over the second broadcast media network by transmitting to said middleware server a second request for a list of scheduled media channels associated with the second payload identifier, the second request including the second payload identifier, whereby the middleware server is configured such that, in response to receiving the second request comprising the second payload identifier, the middleware server determines the second list of scheduled media channels available to the hybrid media receiver and sends to the hybrid media receiver a second response message comprising said second list of scheduled media channels.

17. A middleware server for providing available broadcast media channels to a hybrid media receiver capable of receiving broadcast media content using a first broadcast media network and a second broadcast media network, wherein the first broadcast media network complies with Internet Protocol Television, IPTV, the middleware server comprising:

a service provider discovery module arranged to receive a message notifying the capabilities of the hybrid media receiver to receive media content using the first broadcast media network and the second broadcast media network; and to send to the hybrid media receiver a first payload identifier and a second payload identifier, corresponding to the first broadcast media network and the second broadcast media network, respectively; and such that:

a) in response to the service discovery module receiving a first request transmitted by the hybrid media receiver, wherein the first request comprises the first payload identifier, the service discovery module determines a first list of scheduled media channels available to the hybrid media receiver and sends to the hybrid media receiver a first response message comprising said first list of scheduled media channels, and b) in response to the service discovery module receiving a second request transmitted by the hybrid media receiver, wherein the second request comprises the second payload identifier, the service discovery module determines a second list of scheduled media channels available to the hybrid media receiver and sends to the hybrid media receiver a second response message comprising said second list of scheduled media channels.

18. A method for providing available broadcast media channels to a hybrid media receiver capable of receiving broadcast media content using a first broadcast media network and a second broadcast media network, wherein the first broadcast media network complies with Internet Protocol Television, IPTV, the method, executed in a middleware server, comprising the steps of:

sending to the hybrid media receiver a first payload identifier and a second payload identifier, corresponding to the first broadcast media network and the second broadcast media network, respectively;

receiving a first request transmitted by the hybrid media receiver, wherein the first request comprises the first payload identifier;

in response to receiving the first request comprising the first payload identifier, the middleware server determining a first list of scheduled media channels available to the hybrid media receiver and transmitting to the hybrid media receiver a first response message comprising said first list of scheduled media channels;

receiving a second request transmitted by the hybrid media receiver, wherein the second request comprises the second payload identifier;

in response to receiving the second request comprising the second payload identifier, the middleware server determining a second list of scheduled media channels available to the hybrid media receiver and transmitting to the hybrid media receiver a second response message comprising said second list of scheduled media channels.

19. The method according to claim 18, further comprising the step, prior to the step of sending, of: receiving a message notifying capabilities of the hybrid media receiver to receive media content using the first broadcast media network and the second broadcast media network.

20. The method according to claim 18, wherein the second broadcast media network complies with at least one of the standards in the group consisting of Digital Video Broadcasting-Cable, DVB-C; Digital Video Broadcasting-Satellite, DVB-S; and Digital Video Broadcasting-Terrestrial, DVB-T.

21. The method according to claim 18, wherein the step of receiving comprises receiving a session initiation protocol, SIP, SUBSCRIBE message, the SIP message comprising an ACCEPT header representing the first broadcast media network and an ACCEPT header representing the second broadcast media network.

22. The method according to claim 21, wherein the step of sending a first payload identifier and a second payload identifier comprises sending a SIP NOTIFY message.

23. The method according to claim 18, wherein the step of sending further comprises:

sending a third payload identifier for channel correspondence;

and wherein the method further comprises the step of:

providing to the hybrid media receiver, when queried with the third payload identifier, channel correspondence data, the channel correspondence data comprising mappings between a logical channel and two scheduled media channels of the first list and the second list, respectively.

24. A computer program product comprising a non-transitory computer readable medium storing a computer program for a media middleware server to provide available broadcast media channels to a hybrid media receiver capable of receiving broadcast media content using a first broadcast media network and a second broadcast media network, wherein the first broadcast media network complies with Internet Protocol Television, IPTV, the computer program comprising computer program code which, when run on the media middleware server causes the media middleware server to:

send to the hybrid media receiver a first payload identifier and a second payload identifier, corresponding to the first broadcast media network and the second broadcast media network, respectively;

in response to receiving a first request transmitted by the hybrid media receiver, wherein the first request comprises the first payload identifier, determine a first list of scheduled media channels available to the hybrid media receiver and transmit to the hybrid media receiver a first response message comprising said first list of scheduled media channels; and in response to receiving a second request transmitted by the hybrid media receiver, wherein the second request comprises the second payload identifier, determine a second list of scheduled media channels available to the hybrid media receiver and transmit to the hybrid media receiver a second response message comprising said second list of scheduled media channels.

* * * * *